(12) United States Patent
Whalen et al.

(10) Patent No.: US 9,518,695 B2
(45) Date of Patent: *Dec. 13, 2016

(54) FLAT SCREEN TELEVISION SUPPORT SYSTEM

(75) Inventors: Kenneth J. Whalen, San Diego, CA (US); Paul R. Jones, San Diego, CA (US)

(73) Assignee: LF CENTENNIAL LIMITED, Road Town, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 12/417,902

(22) Filed: Apr. 3, 2009

(65) Prior Publication Data

US 2009/0189029 A1 Jul. 30, 2009

Related U.S. Application Data

(63) Continuation of application No. 11/135,888, filed on May 24, 2005, now Pat. No. 7,530,538.

(51) Int. Cl.
*A47F 5/00* (2006.01)
*F16M 11/28* (2006.01)
*A47B 81/06* (2006.01)
*F16M 13/02* (2006.01)

(52) U.S. Cl.
CPC ............. *F16M 11/28* (2013.01); *A47B 81/061* (2013.01); *F16M 13/02* (2013.01)

(58) Field of Classification Search
USPC ........................ 248/149, 150, 154, 157, 161, 176.1,248/178.1, 176.3, 132, 917, 920, 333, 327; 5/505.1, 503.1, 658; 108/50.01, 50.02; 297/217.3; 312/223.6, 223.1, 7.2, 223.3
See application file for complete search history.

(56) References Cited

U.S. PATENT DOCUMENTS

| 366,525 | A |   | 7/1887 | Taliaferro |
|---|---|---|---|---|
| 368,388 | A |   | 8/1887 | Drake |
| 866,522 | A |   | 9/1907 | Scanlon |
| 1,398,601 | A |   | 11/1921 | Osterhout |
| 1,590,726 | A |   | 6/1926 | Fitzhugh |
| 1,692,337 | A |   | 11/1928 | Forbes |
| 1,797,847 | A |   | 3/1931 | Vandagriff |
| 1,915,727 | A | * | 6/1933 | Friedemann .................. 248/243 |
| 2,193,647 | A | * | 3/1940 | Rush et al. ..................... 108/49 |
| 2,359,895 | A |   | 10/1944 | Burton |
| D141,593 | S |   | 6/1945 | Doty |
| 2,535,112 | A |   | 12/1950 | Woody |
| 2,605,155 | A |   | 7/1952 | Lewis |
| 3,232,249 | A |   | 2/1966 | Perez |
| 3,358,957 | A |   | 12/1967 | Lindenmuth |

(Continued)

*Primary Examiner* — Kimberly Wood
(74) *Attorney, Agent, or Firm* — Barlow, Josephs & Holmes, Ltd.

(57) ABSTRACT

A flat screen television support device includes at least one vertical column extending upwardly from a piece of furniture and a cantilever support extending forwardly from the column and terminating in a free end. A vertical screen mount is connected to the free end of the cantilever support member. A flat screen television is connected to the flat screen television support device and has a rear wall spaced forward of the rear edge of the upper surface of the piece of furniture so that the flat screen television is supported over the piece of furniture between the front and rear edges of the upper surface of the piece of furniture. The piece of furniture may support the entire weight of the flat screen television if the support device is incorporated into a back structure of the furniture.

7 Claims, 5 Drawing Sheets

(56) References Cited

U.S. PATENT DOCUMENTS

| | | | |
|---|---|---|---|
| 3,875,356 A | 4/1975 | Heim et al. | |
| 3,905,573 A | 9/1975 | Davis | |
| 4,020,510 A | 5/1977 | Fabian | |
| 4,272,136 A | 6/1981 | Sengua | |
| 4,410,158 A | 10/1983 | Maffei | |
| 5,207,405 A | 5/1993 | Cobb | |
| 5,282,427 A | 2/1994 | Steinhilber | |
| 5,549,264 A | 8/1996 | West | |
| 6,158,701 A | 12/2000 | Deshler | |
| 6,213,435 B1 * | 4/2001 | Minet | 248/125.8 |
| 6,288,891 B1 | 9/2001 | Hasegawa et al. | |
| 6,327,982 B1 | 12/2001 | Jackson | |
| 6,347,433 B1 | 2/2002 | Novi et al. | |
| 6,425,631 B1 | 7/2002 | Lin | |
| 6,609,691 B2 | 8/2003 | Oddsen, Jr. | |
| D480,237 S * | 10/2003 | de Carolis | D6/474 |
| 6,695,270 B1 | 2/2004 | Smed | |
| 6,699,146 B1 | 3/2004 | Winter et al. | |
| 6,704,193 B2 | 3/2004 | Vathulya | |
| 6,758,454 B2 | 7/2004 | Smed | |
| D495,163 S | 8/2004 | Weatherly | |
| 6,796,536 B1 | 9/2004 | Sevier, IV | |
| 7,082,882 B2 | 8/2006 | Heimbrock | |
| 7,118,080 B2 | 10/2006 | Chan et al. | |
| 7,195,215 B2 * | 3/2007 | Lin | 248/125.9 |
| D539,565 S * | 4/2007 | Sexton, III | D6/474 |
| 7,261,261 B2 * | 8/2007 | Ligertwood | 248/129 |
| 7,489,500 B2 * | 2/2009 | Liou et al. | 361/679.21 |
| 7,530,538 B2 | 5/2009 | Whalen et al. | |
| 2002/0011544 A1 | 1/2002 | Bosson | |
| 2003/0201372 A1 * | 10/2003 | Dozier | 248/286.1 |
| 2004/0011932 A1 | 1/2004 | Duff | |
| 2004/0041062 A1 | 3/2004 | Ozolins et al. | |
| 2004/0079849 A1 | 4/2004 | Rudolf | |
| 2004/0079858 A1 | 4/2004 | Rudolf | |
| 2004/0084578 A1 | 5/2004 | Cho et al. | |
| 2004/0084579 A1 | 5/2004 | Lee et al. | |
| 2004/0113031 A1 | 6/2004 | Sung | |
| 2004/0118984 A1 | 6/2004 | Kim et al. | |
| 2004/0188573 A1 | 9/2004 | Weatherly | |
| 2004/0188574 A1 | 9/2004 | Weatherly et al. | |
| 2004/0211870 A1 | 10/2004 | Bremmon et al. | |
| 2004/0256524 A1 | 12/2004 | Beck et al. | |
| 2005/0041379 A1 | 2/2005 | Jang | |
| 2005/0045782 A1 | 3/2005 | Lee et al. | |
| 2005/0167549 A1 | 8/2005 | Lingertwood | |
| 2007/0252919 A1 * | 11/2007 | McGreevy | 348/825 |

* cited by examiner

… (1)

FLAT SCREEN TELEVISION SUPPORT SYSTEM

CROSS-REFERENCE TO RELATED APPLICATIONS

This application is a continuation of currently pending application Ser. No. 11/135,888 filed May 24, 2005, entitled "Flat Screen Television Support System," which is incorporated by reference in its entirety into this application as if set forth verbatim.

FIELD OF THE INVENTION

The present invention relates generally to the support or mounting of flat screen video display devices, and, more particularly for the support for larger flat screens, such as plasma TVs.

BACKGROUND OF THE INVENTION

The advent of affordable television, or TV, saw the introduction of home TV sets that were rather large and bulky cabinets or consoles that housed a picture tube, associated electrical wiring, and signal receiving and tuning circuitry. The TV set was thus generally a large piece of furniture in and of itself that occupied a major space in the home.

Over the years, the cabinets and consoles were replaced with tabletop, or "portable" which were somewhat smaller and could be used in any number of rooms in the house. These portable models, however, still comprised large picture tubes, wiring, and circuitry enclosed within an outer casing; therefore, these portable models still required a sizable surface area for supporting them and, because the picture tubes were rather deep, a surface area with considerable (24 inches or more) depth.

While innovations in electronics and computer circuitry have made possible smaller and smaller sets, new technologies have led to the introduction of slim, substantially flat, television sets. For example, currently known are plasma screen TVs and liquid crystal TVs, to name just a couple. These sets more resemble framed pictures than they do the conventional television sets of the previous decades. Further, the excellent clarity and precision of cable and satellite signal communication and processing, in association with these new viewing technologies, has led to larger and lighter viewing screens.

Typically today the commercially available plasma screens and liquid crystal displays, because of their thin constructions, have been marketed for and installed on walls in a home family room or entertainment area. These installations are complicated and involve not only mounting the screen on the wall, but also the routing of video and speaker cabling within the walls or behind large pieces of furniture. Once installed, the screen is by practical and economic necessity a more or less permanent fixture. Further, such installation of the screen aesthetically challenges the arrangement of other furnishings within the chosen room.

Attempts to develop furniture-top stands have been met with only marginal success since these taller, longer screens, while thinner, can still easily monopolize the entire top or shelf of a large piece of furniture to the exclusion of other items or accessories.

SUMMARY OF THE INVENTION

The present invention is directed to the support of a flat screen television relative to a piece of furniture that addresses the problems described above. First, the invention eliminates any need to mount the flat screen television on a wall surface. Second, the present invention eliminates the need for furniture-top stands to support the screen on the surface of the furniture, thus leaving the entire surface area clear for other purposes, accessories, etc. Third, the flat screen television is supported a desired distance above the furniture top surface and at a position between the front and rear edges of the furniture top surface. In this regard, the supported flat screen presents the illusion of "floating" above the surface of the furniture top, while at the same time being positioned forwardly and away from the back of the furniture or the wall against which the furniture may be situated. More particularly, the device may be installed on an existing piece of furniture without cosmetically altering the furniture. The support device may be sold alone for use on existing furniture, or it could be sold as part of a piece of furniture. These aspects of the invention are provided in the several exemplary embodiments described herein.

In one embodiment, and in its simplest construction, the supporting device comprises a base for supporting the weight (up to 200 pounds) of the screen on a floor surface. A column extends upwardly from the base and is connected to the back of the piece of the furniture by a bracket, or the like. A cantilever support arm extends forwardly from the column, having a free end with a screen mounting member connected thereto. In a more preferred embodiment, the column has a tubular or polygonal cross-section. In addition to providing structural rigidity and strength to the support, the hollow cross-section is readily adaptable for the concealed routing of cables for the flat screen television, speakers, etc. Optionally, a number of spaced apertures are formed in the column for the ingress and egress of the electrical cables being routed through the column.

In another embodiment, the support device comprises a multi-part construction including a pedestal and an upper support. The pedestal comprises a base for supporting the weight of the screen on a floor surface, a column extending upwardly from the base, and a bracket for connecting the column to the back of the furniture. The upper support comprises a post that is vertically adjustable and slideably received within the column, a cantilever support arm, and a screen mounting member. When the screen mounting position is determined, the upper support is secured in position with the column. The vertical adjustability provides the user with even greater flexibility in adjusting the support to a height that accommodates screens of various sizes, while allowing the user to position the screen the desired distance above the top of the furniture.

In yet another embodiment, the piece of furniture is constructed so that the pedestal of the support is built into or secured to the back of the furniture in such a way as to eliminate the base. Accordingly, the furniture structure itself supports the weight of the flat screen.

It should be pointed out that the invention extends to both the support itself, as well as to the combination of a piece of furniture and the support.

In another embodiment, a flat screen television support system includes a piece of furniture having an upper surface with spaced apart front and rear edges. At least one vertical column is affixed to and extends upwardly from the piece of furniture and is connected to a cantilever support which extends forwardly from an upper end of the column and terminates in a free end. A vertical screen mount is connected to the free end of the cantilever support member, and is connected to a flat screen television. So mounted, the flat screen television has a rear wall spaced forward of the rear edge of the upper surface of the piece of furniture and is supported over the upper surface of the piece of furniture between its front and rear edges. Optionally, the vertical column may be an integral one-piece column, the vertical screen mount may be connected directly to the free end of the cantilever support, and the flat screen television may be connected directly to the vertical screen mount.

In still another embodiment, a flat screen television support system includes a piece of furniture having a back structure and an upper surface with spaced apart front and rear edges. A flat screen television support device is incorporated into the back structure of the piece of furniture. The flat screen television support device includes at least one vertical column extending upwardly from the piece of furniture and a cantilever support member extending forwardly from the column and terminating in a free end. A vertical screen mounting member is connected to the free end of the cantilever support member. A flat screen television is connected to the flat screen television support device and has a rear wall spaced forward of the rear edge of the upper surface of the piece of furniture so that the flat screen television is supported over the piece of furniture between the front and rear edges of the upper surface of the piece of furniture. In this embodiment, the piece of furniture supports the entire weight of the flat screen television. Optionally, the vertical column may be an integral one-piece column, the vertical screen mounting member may be connected directly to the free end of the cantilever support member, and the flat screen television may be connected directly to the vertical screen mounting member.

These and other aspects of the present invention will become apparent to those skilled in the art after a reading of the following description of the preferred embodiments when considered in conjunction with the drawings. It should be understood that both the foregoing general description and the following detailed description are exemplary and explanatory only and are not restrictive of the invention as claimed.

BRIEF DESCRIPTION OF THE DRAWINGS

These and other features of the invention are described in further detail in the following description and will be better understood with reference to the accompanying drawings, which are briefly described below.

DETAILED DESCRIPTION

Exemplary embodiments of the invention are described in detail below with reference to the appended figures, wherein like elements are referenced with like numerals throughout. The figures are not necessarily drawn to scale and do not necessarily show every detail or structure of the various embodiments of the invention, but rather illustrate exemplary embodiments and mechanical features in order to provide an enabling description of such embodiments.

Figure 1:
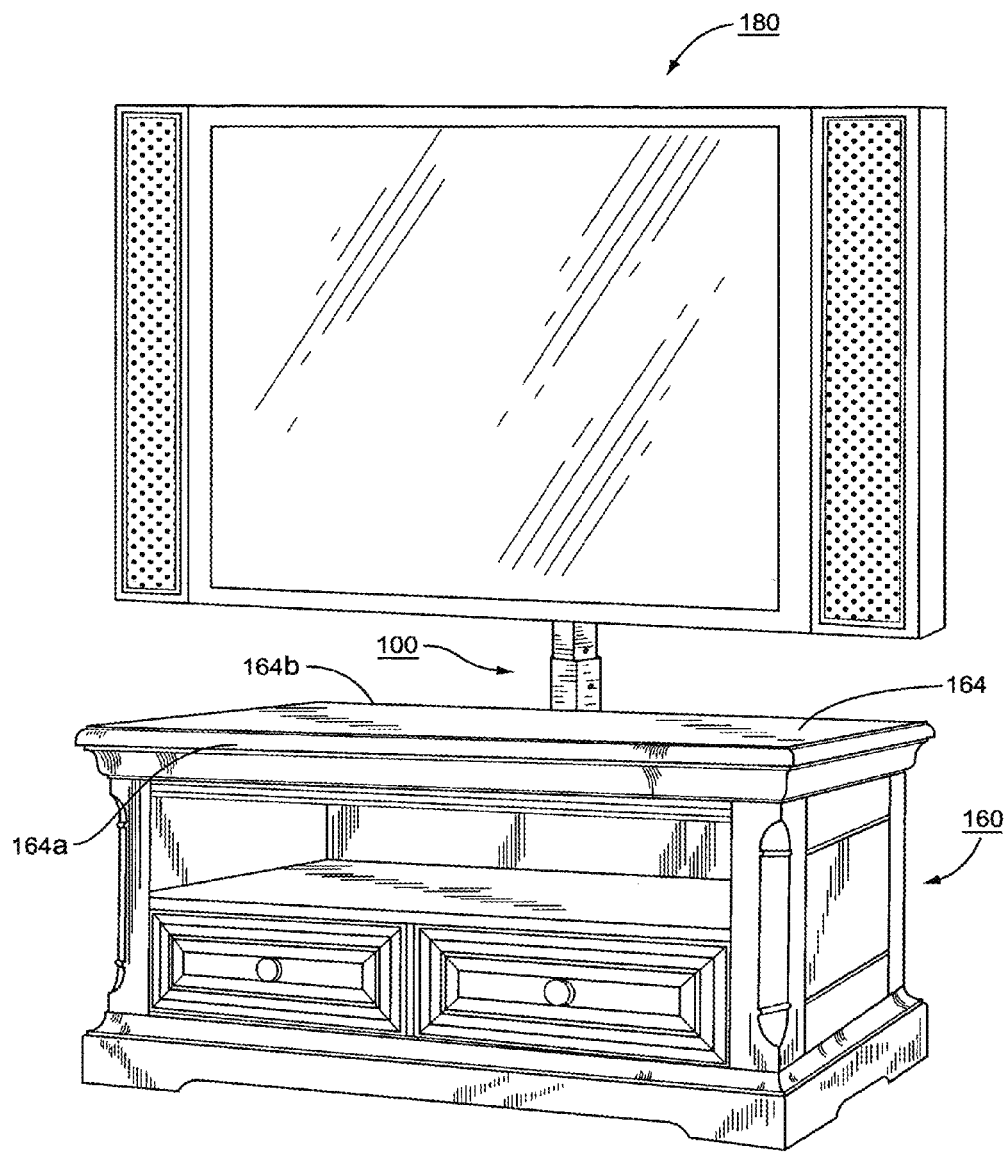
FIG. 1 is a front perspective view of a piece of furniture with the support device attached thereto in accordance with the present invention.

Shown generally in the environmental view of FIG. 1, and in detail in FIGS. 2 through 5, the present invention is directed to the idea of supporting a substantially flat screen television 180 over a piece of furniture 160 with a support device 100. So supported by the device 100, the flat screen television 180 is supported above the surface 164 of the furniture at a prescribed point between the front 164a and rear 164b edges thereof. So constructed and installed, the support device 100 is substantially concealed from view, yet gives the illusion that the television 180 is floating above the medial or front portion of the upper surface of the furniture piece.

Figure 2:
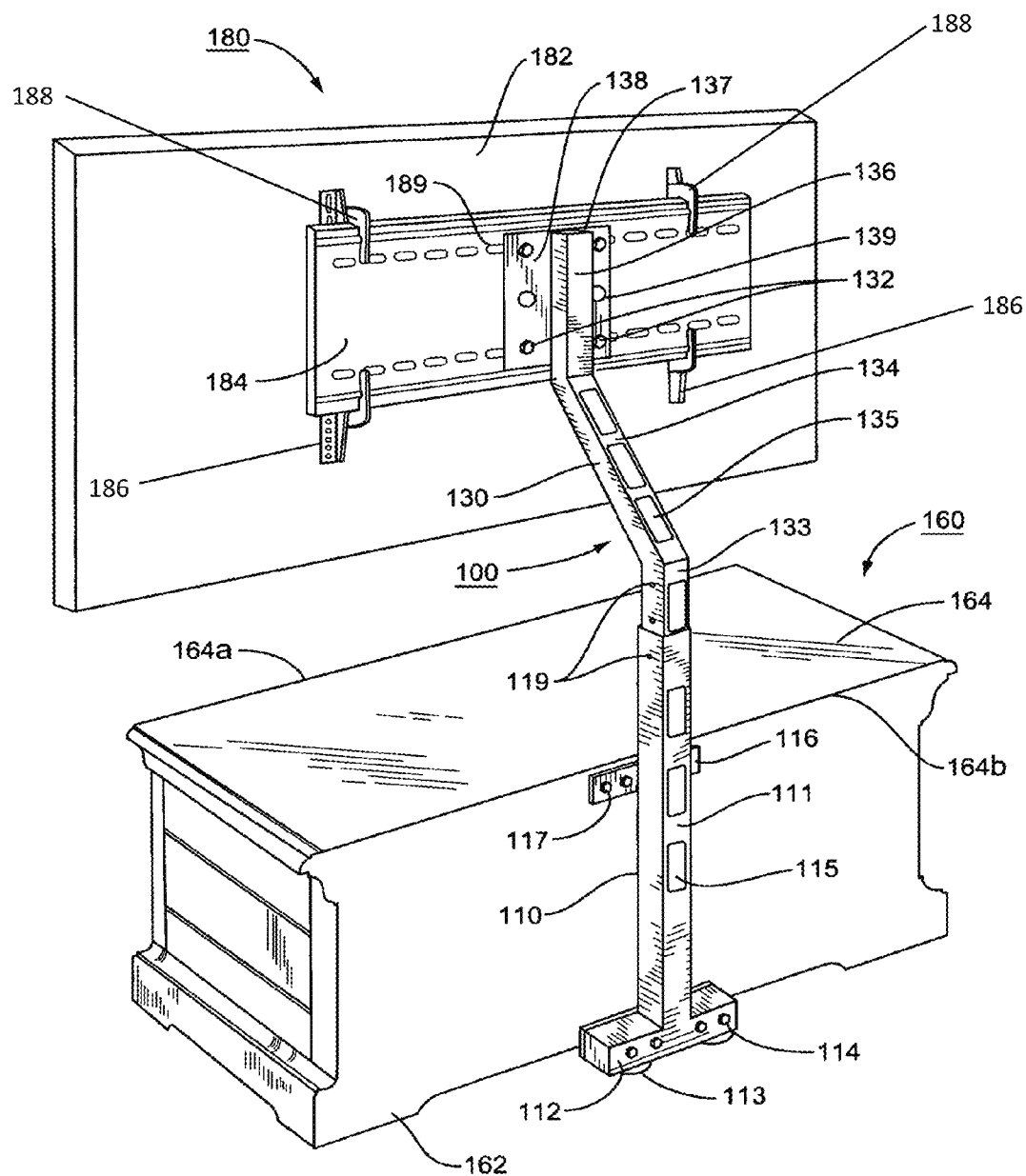
FIG. 2 is a rear perspective view of the furniture and support device illustrated in FIG. 1.
Figure 3:
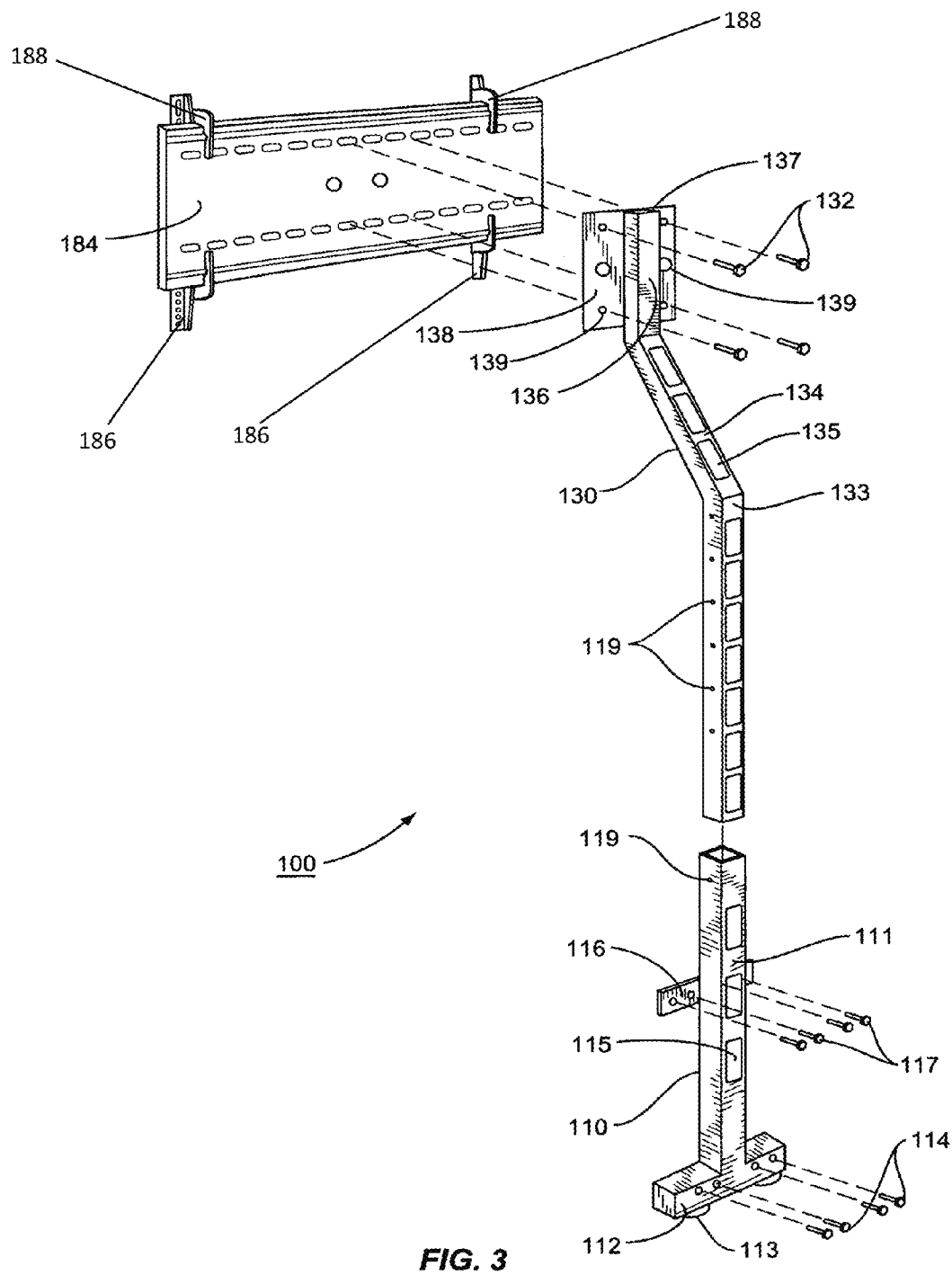
FIG. 3 is an exploded view of the support device of FIG. 2.

In one embodiment, and as shown in FIG. 2, the device 100 comprises a pedestal 110 and an upper support 130. While the materials of construction are not critical to the novel features of the device 100 described herein, the material that is selected should provide sufficient strength and rigidity to support a flat screen television weighing up to about 200 pounds. For the exemplary constructions shown herein, a strong metal such as steel having a nominal thickness of about 3 millimeters has been selected. The methods of casting, welding, or otherwise shaping and forming the device 100 are well known to be within the skill of the craftsman in the art. The pedestal 110 comprises a base 112 which transfers the weight of both the support and a television screen 180 onto a floor surface. As shown in FIGS. 2 and 3, the base 112 is formed as a box-like shape in contact with the floor. Optional feet 113, such as castors or cups, may be connected beneath the base 112 to provide additional gripping support. A column 111 extends vertically upward from the base 112 adjacent the rear wall of the furniture piece 160. A bracket or attachment plate 116 provides for connection of the column 111 to the rear wall of the furniture piece 160 at a point above the base 112 that is sufficient to stabilize the load from the television screen 180 and to prevent any lateral, forward, or rearward movement of the column 111. The bracket 116 may be fastened in any of the conventional ways with bolts 117, screws, etc. Fasteners 114 may also be used to connect the base 112 against the bottom back 162 of the furniture 160 for further stability.

As described more fully below, the column 110 may be formed with a tubular or polygonal cross-section so that it has a substantially hollow core. Moreover, so formed the column 110 has much greater strength and rigidity than would a planar or unenclosed column.

The upper support 130 comprises a post 133 that extends upwardly from the column 110 for cooperative engagement and vertical adjustment with column 110. Thus, the device could be dimensioned with a total height sufficient to accommodate television screens of various heights. As shown in the figures, the post 133 comprises a tubular or polygonal cross-section that is similar in shape, but with a cross-section less than that of the column 110. This enables the column 110 to slideably receive the post 133. Similarly spaced openings 119 are provided in both the column 110 and post 133 for mating alignment so that pins (not shown), bolts, or other fasteners may secure the column 110 and post 133 in the desired vertical position.

One aspect of the hollow construction of the device 100 is that it enables the user to route electrical cables therethrough to both facilitate electrical interconnection to the flat screen television 180 and to conceal the cables from view. To further facilitate such routing, spaced apart apertures 115, 135 in the column 110 and post 133 provide for the ingress and egress of electrical cables being routed through the column 110 and post 133.

While shown in the Figures as a two-piece adjustable height construction, it should be realized that an integral support (not shown), without height adjustment is also within the scope of the invention. In certain situations, height adjustment may not be necessary where the supports are being made for a large volume of flat screen televisions of substantially the same dimension to be used with furniture pieces of substantially the same height. Also, as described further below, in cases of lightweight television sets, the support could be fixed to the rear of the furniture piece without a base. In such cases the load is carried entirely by the rear wall of the furniture.

A cantilever arm 134 extends upwardly and forwardly from the vertically adjustable post 133, terminating in a free end 137. As used herein, "cantilever" refers to a projecting structure, such as a beam, that is supported at one end and carries a load at the other end or along its length. The cantilever arm 134 further includes a short vertical outer arm 136 to which is secured a screen mounting member 138. This vertical outer arm 136 provides increased rigidity, greater surface area for attachment of the flat screen television 180 mounting plate 184 to the screen mounting member 138, and facilitates the proper vertical orientation of the flat screen television 180. A series of spaced apart apertures 139 are formed in the screen mounting member 138 so that the mounting member 138 may be universally mountable to any of a plurality of flat television screens having varied mounting configurations and/or mounting plates. As shown in FIG. 2, the mounting member 138 is fastened to the standard wall mounting plate 184 via apertures 186 in the wall mounting plate using fasteners 132. The standard wall mounting plate 184 fastens to the back 182 of the flat screen television 180 in accordance with the mounting instructions for the particular make and model of flat screen television. More specifically, as illustrated in the drawings, a pair of vertically extending mounting brackets 186 are secured to the back side 182 of television 180. The television 180 is then received onto the mounting plate 184 by mounting hooks 188 which extend rearwardly from the mounting brackets 186.

Figure 4:
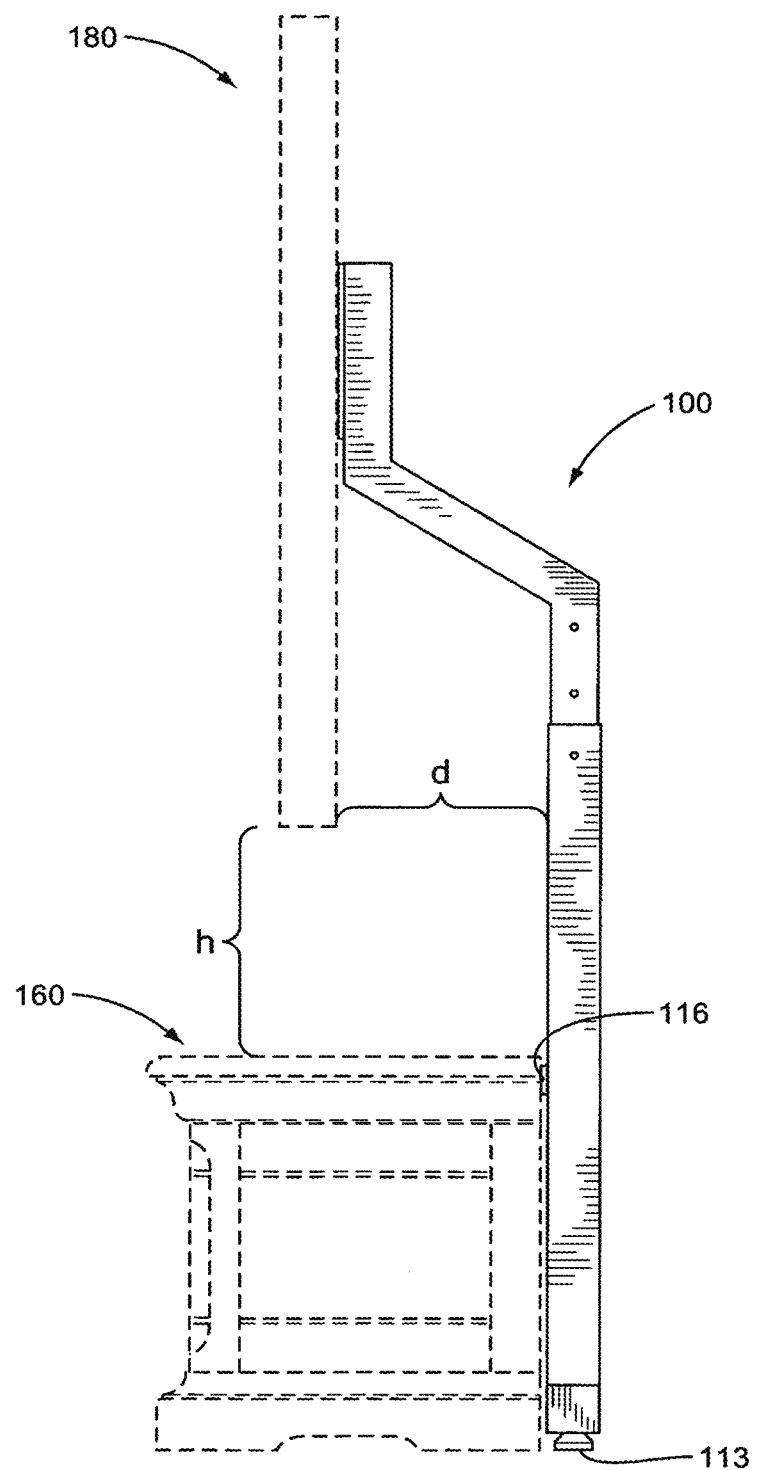
FIG. 4 is a side view of the support of illustrated in FIGS. 1 and 2.

Turning now to FIG. 4, the embodiment of FIGS. 1 and 2 is shown in elevational view. FIG. 4 illustrates the novel design of the supporting device 100 in (1) supporting the flat television screen 180 a desired adjustable height, h, above the surface 164 of the furniture 160, and (2) the rear wall 182 of the television unit at a prescribed distance, d, from the rear edge 164b of the upper surface 164. In a preferred embodiment, the distance d is at least 2 inches.

Figure 5:
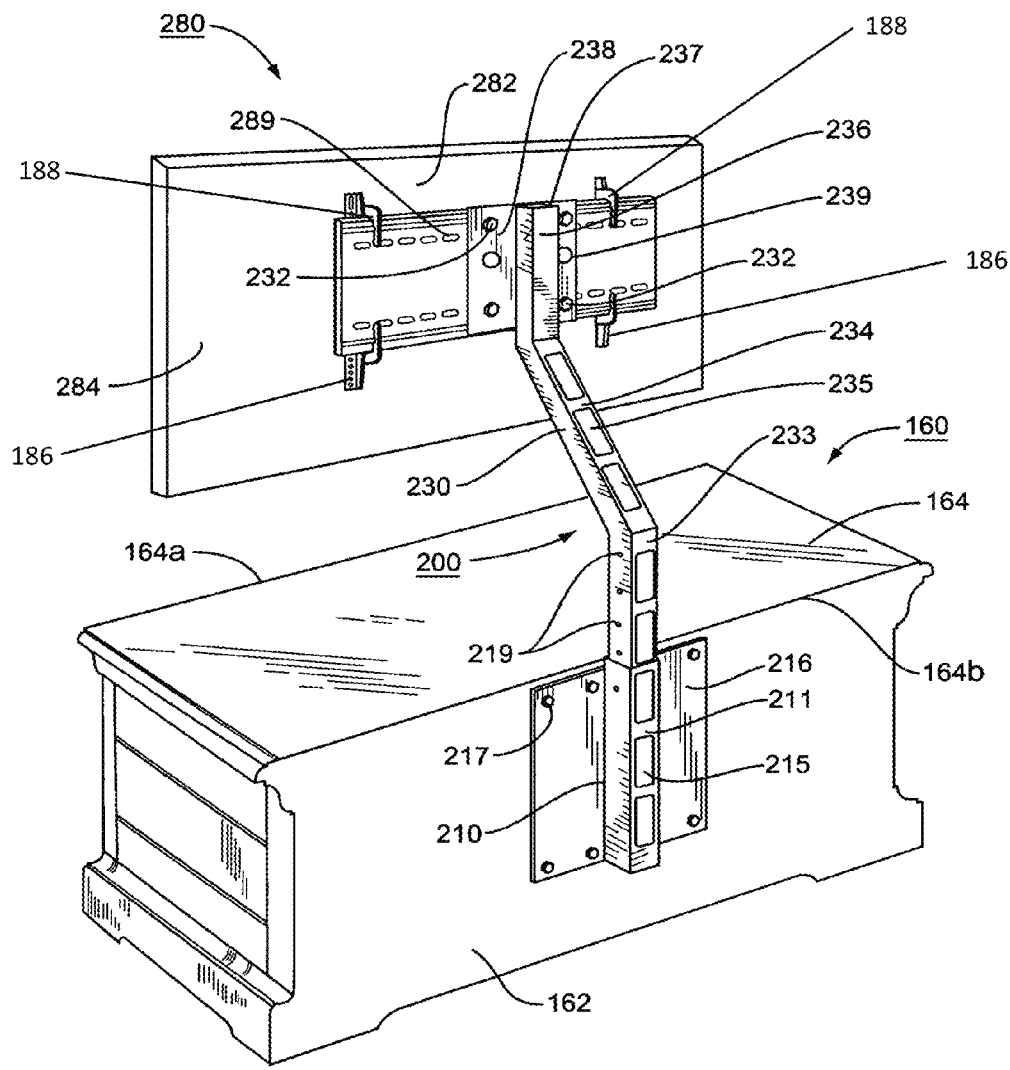
FIG. 5 is a rear perspective view of a support device in combination with a piece of furniture.

The embodiments described hereinabove are constructed for attachment to a piece of furniture. Accordingly, the base 112 described herein provides a load-bearing function to support the weight of the flat screen television 180 so that the furniture to which the device 100 is attached does not have to be structurally capable of supporting a flat screen television of 200 pounds or more. However, as those skilled in the art will appreciate, the furniture, and hence the device, could be assembled such that the support device is incorporated into or onto the back structure of the furniture, as shown in FIG. 5. In much the same way that the device is shown in FIG. 2, the furniture itself could be constructed to support the weight of the television screen, thus eliminating the need for a separate load-bearing base for the device. Similarly, and as discussed above, the device may be fixed at a permanent height or may optionally be vertically adjustable to accommodate a larger range of sizes of screens and to permit the user to selected a desired height, h, for the screen above the surface of the furniture.

As shown in FIG. 5, a vertically adjustable support device 200 is shown incorporated onto the back of the piece of furniture 160 for supporting flat screen television 280. The device 200 comprises a pedestal 210 and an upper support 230. A column 211 extends vertically upward and is connected to the back 162 of the piece of furniture. A bracket or attachment plate 216 provides for connection of the pedestal 210 to the back 162 of the furniture piece 160 at a point sufficient to support and stabilize the load from the television screen 280. The bracket 216 may again be fastened in any of the conventional ways with bolts 217, screws, etc. The upper support 230 comprises a post 233 that extends upwardly from the column 210 for cooperative engagement and vertical adjustment with column 210. Similarly spaced openings 219 are provided in both the column 210 and post 233 for mating alignment so that pins (not shown), bolts, or other fasteners may secure the column 210 and post 233 in the desired vertical position. Spaced apart apertures 215 and 235 in the column 210 and post 233 provide for the ingress and egress of electrical cables being routed. A cantilever arm 234 extends upwardly and forwardly from the vertically adjustable post 233, again terminating in a free end 237. The cantilever arm 234 includes the short vertical outer arm 236 to which is secured a screen mounting member 238. Spaced apart apertures 239 are again formed in the screen mounting member 238 so that the mounting member 238 may be universally mountable to any of a plurality of flat television screens/wall mounting plates using fasteners 232.

Various modifications and alterations of the invention will become apparent to those skilled in the art without departing from the spirit and scope of the invention, which is defined by the accompanying claims. For example, it should be noted that steps recited in any method claims below do not necessarily need to be performed in the order they are recited. For example, in certain embodiments, steps may be performed simultaneously. The accompanying claims should be constructed with these principles in mind.

Any element in a claim that does not explicitly state "means for" performing a specified function or "step for" performing a specified function is not to be interpreted as a "means" or "step" clause as specified in 35 U.S.C. §112, ¶ 6.

What is claimed is:

1. A flat screen television support system comprising, in combination:
   a furniture piece having an upper surface, said upper surface having a rear edge and a front edge spaced from the rear edge, said furniture piece further having a back side arranged in facing relation with a wall surface against which the furniture piece is situated;
   a flat screen television support device for supporting a flat screen television above said upper surface of said furniture piece comprising,
      a pair of panel brackets secured to a back of a flat screen television,
      a flat screen television wall mounting plate having a front side configured and arranged to receive mounting hooks extending rearwardly from said panel brackets,
      said flat screen television wall mounting plate further having a back side,
      a vertical column having a lower portion arranged adjacent said back side of said furniture piece and removably connected to said back side of said furniture piece at a point above a lower end thereof so as to prevent lateral, forward and rearward movement of said vertical column, said vertical column further having an upper portion extending upwardly above said upper surface of said furniture piece,
a cantilever arm extending from said upper portion of said vertical column, and
a screen mounting member having one side secured to said cantilever arm and a second side secured to said back side of said flat screen television wall mounting plate,
wherein said flat screen television is supported above said upper surface of said furniture piece at a position between said rear edge and said front edge of said upper surface of said furniture piece, said flat screen television facing forwardly and being visible for viewing by a viewer facing a front side of said furniture piece.

2. The flat screen television support system of claim 1 wherein said upper portion of said vertical column is slidably adjustable relative to said lower portion of said vertical column.

3. A flat screen television support system comprising, in combination:
a furniture piece having an upper surface, said upper surface having a rear edge and a front edge spaced from the rear edge, said furniture piece further having a back side arranged in facing relation with a wall surface against which the furniture piece is situated;
a flat screen television support device for supporting a flat screen television above said upper surface of said furniture piece comprising,
a pair of panel brackets secured to a back of a flat screen television,
a flat screen television wall mounting plate having a front side configured and arranged to receive mounting hooks extending rearwardly from said panel brackets,
said flat screen television wall mounting plate further having a back side, and
a vertical column having a lower portion arranged adjacent said back side of said furniture piece and removably connected to said back side of said furniture piece at a point above a lower end thereof so as to prevent lateral, forward and rearward movement of said vertical column, said vertical column further having an upper portion extending upwardly above said upper surface of said furniture piece,
said back side of said flat screen television wall mounting plate being supported at said upper portion of said vertical column;
wherein said flat screen television is supported above said upper surface of said furniture piece at a position between said rear edge and said front edge of said upper surface of said furniture piece, said flat screen television facing forwardly and being visible for viewing by a viewer facing a front side of said furniture piece.

4. The flat screen television support system of claim 3 wherein said upper portion of said vertical column is slidably adjustable relative to said lower portion of said vertical column.

5. A flat screen television support system comprising, in combination:
a furniture piece having an upper surface, said upper surface having a rear edge and a front edge spaced from the rear edge, said furniture piece further having a back side arranged in facing relation with a wall surface against which the furniture piece is situated;
a flat screen television support device for supporting a flat screen television above said upper surface of said furniture piece comprising,
a pair of panel brackets secured to a back of a flat screen television,
a flat screen television wall mounting plate having a front side configured and arranged to receive mounting hooks extending rearwardly from said panel brackets,
said flat screen television wall mounting plate further having a back side,
a vertical column having a lower portion arranged adjacent said back side of said furniture piece and removably connected to said back side of said furniture piece at a point above a lower end thereof so as to prevent lateral, forward and rearward movement of said vertical column, said vertical column further having an upper portion extending upwardly above said upper surface of said television stand, and
a cantilever arm extending from said upper portion of said vertical column, said back side of said flat screen television wall mounting plate being supported on said cantilever arm,
said flat screen television being supported above said upper surface of said furniture piece at a position between said rear edge and said front edge of said upper surface of said furniture piece, said flat screen television facing forwardly and being visible for viewing by a viewer facing a front side of said furniture piece.

6. The flat screen television support system of claim 5 wherein said upper portion of said vertical column is slidably adjustable relative to said lower portion of said vertical column.

7. A flat screen television support device for supporting a flat screen television above an upper surface of a furniture piece comprising:
a pair of panel brackets secured to a back of a flat screen television;
a flat screen television wall mounting plate having a front side configured and arranged to receive mounting hooks extending rearwardly from said panel brackets, said flat screen television wall mounting plate further having a back side;
a vertical column having a lower portion configured to be arranged adjacent said back side of said furniture piece and further configured to be removably connected to a back side of said furniture piece at a point above a lower end thereof so as to prevent lateral, forward and rearward movement of said vertical column, said vertical column further having an upper portion configured to extend upwardly above said upper surface of said furniture piece;
a cantilever arm extending from said upper portion of said vertical column; and
a screen mounting member having one side secured to said cantilever arm and a second side secured to said back side of said flat screen television wall mounting plate,
wherein said flat screen television is supported above said upper surface of said furniture piece at a position between said rear edge and said front edge of said upper surface of said furniture piece when said support device is secured to said back side of said furniture piece.

* * * * *